US012512585B2

(12) United States Patent
Lam et al.

(10) Patent No.: US 12,512,585 B2
(45) Date of Patent: Dec. 30, 2025

(54) EXTERNAL ANTENNA KIT

(71) Applicant: FLYTECH TECHNOLOGY CO., LTD., Taipei (TW)

(72) Inventors: Tai-Seng Lam, Taipei (TW); Hung-Bo Shiue, Taipei (TW)

(73) Assignee: FLYTECH TECHNOLOGY CO. , LTD., Taipei (TW)

(*) Notice: Subject to any disclaimer, the term of this patent is extended or adjusted under 35 U.S.C. 154(b) by 46 days.

(21) Appl. No.: 18/647,059

(22) Filed: Apr. 26, 2024

(65) Prior Publication Data

US 2025/0246805 A1 Jul. 31, 2025

(30) Foreign Application Priority Data

Jan. 26, 2024 (TW) ................................ 113103201

(51) Int. Cl.
*H01Q 1/22* (2006.01)
*H01Q 1/52* (2006.01)

(52) U.S. Cl.
CPC ........... *H01Q 1/526* (2013.01); *H01Q 1/2275* (2013.01)

(58) Field of Classification Search
CPC ...... H01Q 1/22; H01Q 1/2266; H01Q 1/2275; H01Q 1/2291; H01Q 1/24; H01Q 1/52; H01Q 1/526
See application file for complete search history.

(56) References Cited

U.S. PATENT DOCUMENTS 5,986,608 A * 11/1999 Korisch ............... H04B 1/3833 343/702
6,473,045 B1 * 10/2002 Duquerroy ............. H01R 24/46 343/702
6,538,607 B2 * 3/2003 Barna .................. H04B 1/3877 343/702
6,556,812 B1 * 4/2003 Pennanen ................ H01Q 1/32 343/702
6,924,770 B2 * 8/2005 Carpenter ........... H04M 1/0202 343/702
10,244,151 B2 * 3/2019 Zhang .................... H04N 23/51
2014/0375513 A1 * 12/2014 Kang ..................... H01Q 21/28 343/720

* cited by examiner

*Primary Examiner* — Tho G Phan
(74) *Attorney, Agent, or Firm* — Demian K. Jackson; Jackson IPG PLLC

(57) ABSTRACT

The present invention relates to an external antenna kit. The kit includes a first module including a first electromagnetic shielding zone and a first electromagnetic transmission zone; a second module including a second electromagnetic shielding zone and attached to and communicatively connected with the first module; an external antenna configured separately from and electrically connected to the second module; and an antenna slot configured within the first electromagnetic transmission zone on the first module and having a structural geometry corresponding to that of the external antenna to provide for insertion of the external antenna.

10 Claims, 5 Drawing Sheets

EXTERNAL ANTENNA KIT

CROSS-REFERENCE TO RELATED APPLICATION

This application claims priority benefit to Taiwan Invention patent application No. 113103201, filed on Jan. 26, 2024, in Taiwan Intellectual Property Office, the entire disclosures of which are incorporated by reference herein.

FIELD

The present invention relates to an external antenna kit, in particular to an external antenna kit deployed in the electromagnetic transmission zone and capable of being incorporated into a housing structure of any electronic device.

BACKGROUND

In conventional technology, antennas used to receive and transmit wireless radio frequency signals should preferably be located in electromagnetic transmission zones rather than electromagnetic shielding zones. This is because electromagnetic shielding zones create an electromagnetic shielding effect that hinders the propagation of wireless signals. Placing antennas in electromagnetic shielding zones would result in attenuation of wireless RF signals, which would affect the quality of the transmitted and received signals and potentially increase the transmission error rate.

Although positioning antennas near electromagnetic shielding zones does not directly cause signal attenuation, it may cause additional signal interference. This is because wireless radio frequency signals may be reflected or scattered when they encounter electromagnetic shielding objects, resulting in signal cross-interference and a reduction in overall communication quality and performance.

However, modern electronic devices typically contain a large amount of conductive materials, such as metal housings, circuit boards, electronic components, batteries, conductive adhesives, conductive coatings, metal supports, wires, and connectors, and so on. The metal housings create a Faraday shielding effect that absorbs radio frequency signals entering or leaving the metal housing, causing significant signal attenuation.

Other conductive materials, depending on their relative position to the antenna, may reflect or scatter wireless radio frequency signals to varying degrees, thereby weakening the signal strength received by the antenna or reducing the radiated power density, gain, or directivity of the signals emitted by the antenna.

However, many modern electronic devices, in order to integrate powerful functions while maintaining compactness, have increasingly compact structural layouts, resulting in very limited available electromagnetic transmission areas. Therefore, finding or creating electromagnetic transmission areas within these electronic devices, or flexibly modifying the structure and arrangement of antennas to fully utilize the limited electromagnetic transmission areas for the transmission and reception of wireless radio frequency signals, has become an extremely important technical challenge and is one of the problems that conventional antenna technology needs to overcome.

Hence, there is a need to solve the above deficiencies/issues.

SUMMARY

The present invention relates to an external antenna kit, in particular to an external antenna kit deployed in the electromagnetic transmission zone and capable of being incorporated into a housing structure of any electronic device.

Accordingly, the present invention provides an external antenna kit. The kit includes a first module including a first electromagnetic shielding zone and a first electromagnetic transmission zone; a second module including a second electromagnetic shielding zone and attached to and communicatively connected with the first module; an external antenna configured separately from and electrically connected to the second module; and an antenna slot configured within the first electromagnetic transmission zone on the first module and having a structural geometry corresponding to that of the external antenna to provide for insertion of the external antenna.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
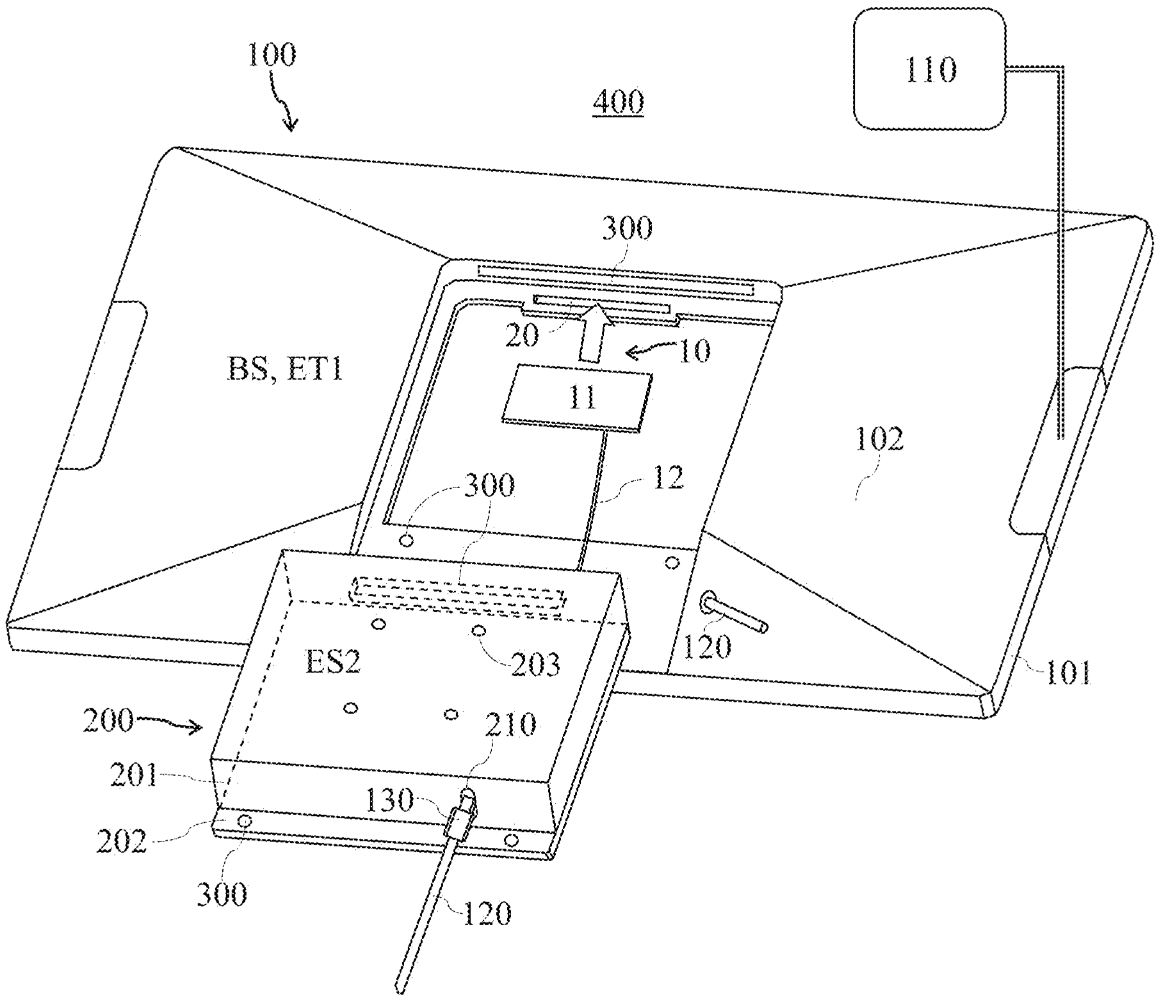
FIG. 1 is a schematic diagram illustrating the overall structure for the information system and the external antenna kit according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Figure 2:
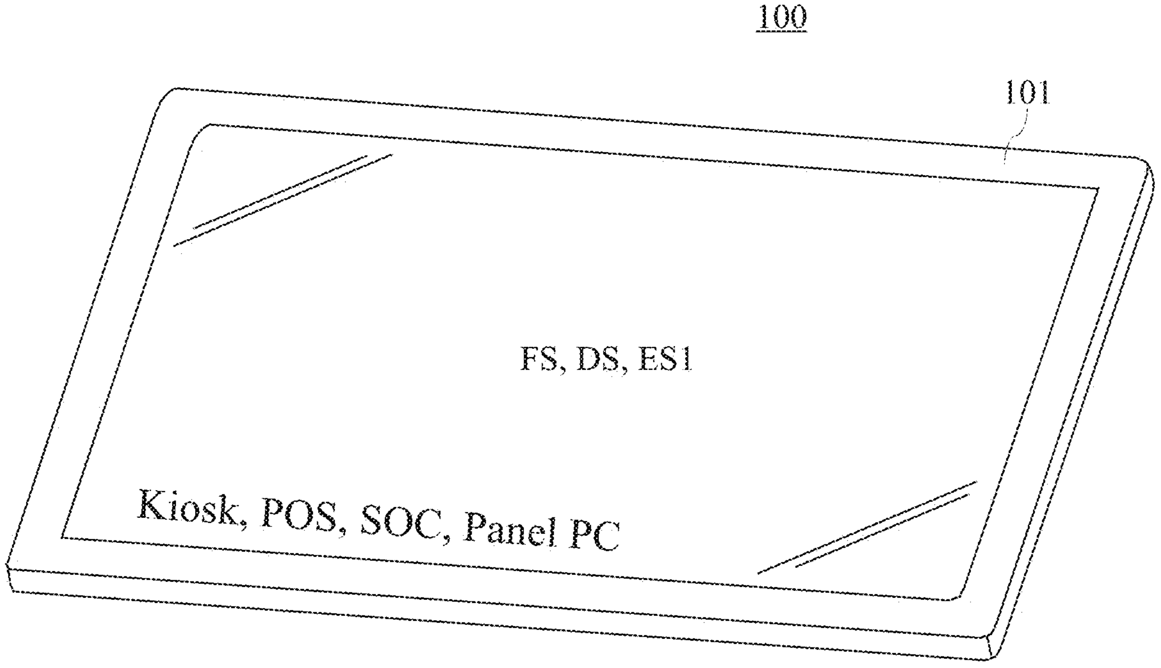
FIG. 2 is a schematic diagram illustrating the front structure for the first module according to the present invention.

FIG. 1 is a schematic diagram illustrating the overall structure for the information system and the external antenna kit according to the present invention; and FIG. 2 is a schematic diagram illustrating the front structure for the first module according to the present invention. The information system 400 according to the present invention includes multiple major parts such as the first module 100, the second module 200, and the external antenna kit 10.

The first module 100 refers to an electronic module at the front-end which the electronic module functions as an input/output (I/O) interface that is configured to display information facing a user and to receive inputs and operations from the user, and includes a display, a touch screen, and other electronic circuit components. The first module 100 is also configured to communicate with other peripheral devices 110, including but not limited to: scanners, card readers, swipe machines, NFC card readers, fingerprint recognizers, printers, cameras, mice, keyboards, speakers, smart buttons (iButton), secondary displays, biometric recognizers, and electronic payment devices, and the like.

The internal electronic control module that drives and controls the first module 100 is separately configured within a separate second module 200. The first module 100 is preferably referred to as a front-end module, front display module, display device, or touch display device, etc.

The housing parts of the first module 100 include a first housing 101 at the front side FS and functioning as a front housing, and a second housing 102 at the back side BS and functioning as a rear plate. The first housing 101 and the second housing 102 are preferably made of plastic or other dielectric materials. The front side FS refers to the surface including the display surface DS provided by a display device or a touch screen. Therefore, there are various electronic components including metal structures configured below and under the front side FS. Thus, the front side FS of the first module 100 causes a certain degree of electromagnetic shielding effect for electromagnetic waves such as wireless radio frequency signals, rendering the front side FS a first electromagnetic shielding zone ES1.

The back side BS of the first module 100, particularly the parts close to the second housing 102, includes relatively fewer electronic components, metallic conductive materials, or metallic structures. Therefore, the back side BS is less likely to cause electromagnetic shielding effects for electromagnetic waves such as wireless radio frequency signals, allowing more electromagnetic waves to penetrate. Thus, the back side BS belongs to the first electromagnetic transmission zone ET1.

The second module 200 is preferably a separable control box module containing the internal electronic control module required to drive and control the first module 100. The second module 200 internally includes a processor based on x86 or ARM architecture, a microcontroller, a basic input/output system (BIOS), a unified extensible firmware interface (UEFI) unit, an embedded controller (EC), a memory (RAM), a storage media such as a solid-state drive (SSD), a SD card, or a mechanical hard drive, a power management module, a speaker, a network power module, a cooling unit, or an integrated communication interface.

The first module 100 and the second module 200 have a unified internal communication interface that forms an integrated communication connection. The first module 100 is configured to integrate and unify all different specifications of communication interfaces into a single transmission line 120 and a single internal transmission connector 130. The second module 200 is configured to have a corresponding single internal communication connector 210. The bi-directional communicative connection between the first module 100 and the second module 200 is completed by inserting the single internal transmission connector 130 into the internal communication connector 210 having a unified signal interface.

The housing components of the second module 200 include a first cover body 201 that functions as a top cover, and a second cover body 202 that functions as a bottom cover. An engaging-fastening linkage module 300 is distributed and configured over the first housing 101, the second housing 102, the first cover body 201, and the second cover body 202 to physically connect the first module 100 to the second module 200 and to peripheral devices 110 to form an information system 400.

In some embodiments, the engaging-fastening linkage module 300 preferably includes but is not limited to: slots, recesses, protrusions, positioning holes, assembly holes, mounting holes, locating slots, hole positions, apertures, openings, blind holes, tenons, pins, clasps, buckles, latches, snap fasteners, snap closures, snap hooks, card slots, buckle rings, push buttons, locking rings, press studs, quick-release structures, screws, tapped holes, threading holes, bolts, nuts, rivets, or circlips, to physically connect the first module 100 with the second module 200 via engaging mechanisms and fastening mechanisms.

By exchanging the second module 200 with another having different functionalities, the information system 400 including the first module 100 and the second module 200 can preferably be transformed into various application-end information terminal devices, including but not limited to: a point of sale (POS) terminal, a tablet computer, a medical-grade tablet computer, an information kiosk, a signage display, and a self-checkout (SOC) terminal.

On the first cover body 201 of the second module 200, there are also multiple adaptor structures 203, which are preferably, but not limited to: slots, recesses, protrusions, positioning holes, assembly holes, mounting holes, locating slots, hole positions, apertures, openings, blind holes, tenons, pins, clasps, buckles, latches, snap fasteners, snap closures, snap hooks, card slots, buckle rings, push buttons, locking rings, press studs, circlips, quick-release structures, screws, tapped holes, threading holes, bolts, nuts, rivets, or circlips. In this embodiment, the adaptor structures 203 are preferably multiple threading holes.

When the second module 200 is assembled with the first module 100 by the engaging-fastening linkage module 300 to form a complete information system 400, the information system 400 is then to be fixed to a specific mounting point by the adaptor structures 203 configured on the first cover body 201. The mounting points are preferably a support frame, a base, a platform, a housing, or a specific position on a wall.

Therefore, the first cover body 201 of the second module 200 must have a structural strength sufficient to at least support and bear the total weight of the second module 200 and the first module 100, and preferably further have a certain degree of heat dissipation ability and grounding effect. Therefore, the first cover body 201 is preferably made of a metallic material that would cause an electromagnetic shielding effect on electromagnetic waves, so that the covered area of the first cover body 201 belongs to the second electromagnetic shielding zone ES2.

Due to the electromagnetic shielding effect caused by the first cover body 201, wireless radio frequency signals entering or leaving the first cover body 201 would be blocked, which causes certain interference to the internal communication module for the second module 200, resulting in poor transmission and reception of signals and lower communication quality.

Therefore, the communication module included in the second module 200 includes an external antenna 11, which is configured separately from the second module 200 and positioned away from the first cover body 201. The external antenna 11 is deployed in the electromagnetic transmission zone ET1 on the first module 100 and is electrically connected to the communication module included in the second module 200 via a signal line 301.

Thus, a set of an external antenna kit 10 including the external antenna 11 and an antenna slot 20 is configured and deployed in the electromagnetic transmission zone ET1 on the first module 100. By configuring the external antenna 11 in the electromagnetic transmission zone ET1 outside the first cover body 201, particularly in positions where electromagnetic waves can easily penetrate, the electromagnetic shielding effect created by the first cover body 201 is therefore avoided, thereby improving the quality of signal transmission and reception with respect to the communication module.

In some embodiments, the external antenna 11 has a geometric structure that is preferably designed to be flat, particularly in a rectangular and flat shape, to minimize the amount of space occupied. Such a geometric structure allows components within the first module 100 to remain compactly arranged, and is helpful in maintaining the information system 400 in a thin or tablet structure. In addition, a rectangular, flat antenna structure helps reduce mutual interference with other internal communication components, thereby improving signal transmission and reception quality. Moreover, manufacturing a rectangular, flat antenna is much easier and can also reduce manufacturing costs. However, the geometric shape of the external antenna 11 is not limited to rectangular and flat, but can also be flat, circular, triangular, polygonal, or other shapes. The external antenna 11 is preferably a Wi-Fi antenna, Bluetooth (BT) antenna, LTE antenna, or Sub-G antenna.

Figure 3:
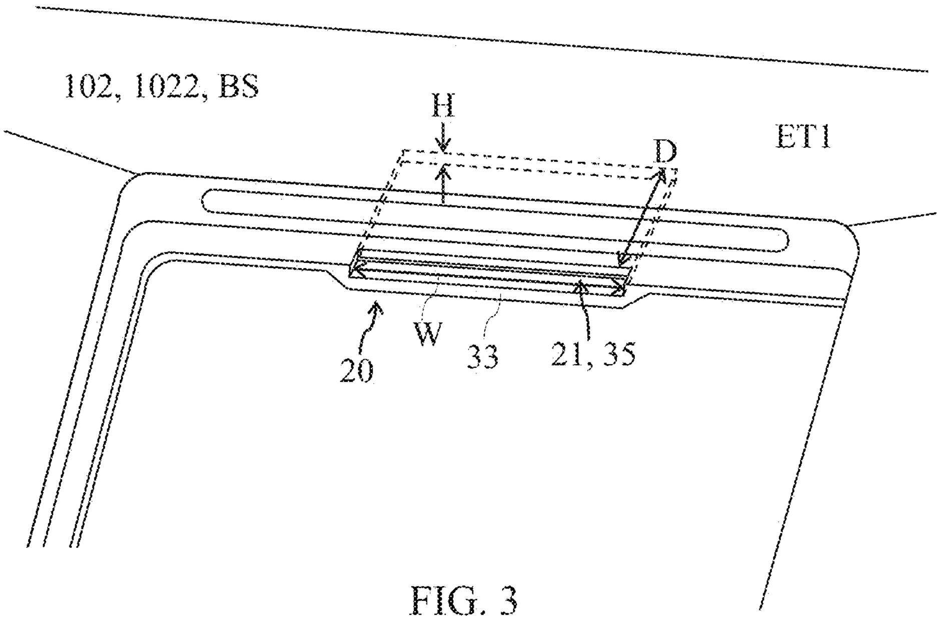
FIG. 3 is a schematic diagram illustrating the structure for the outer surface of the second housing according to the present invention.
Figure 4:
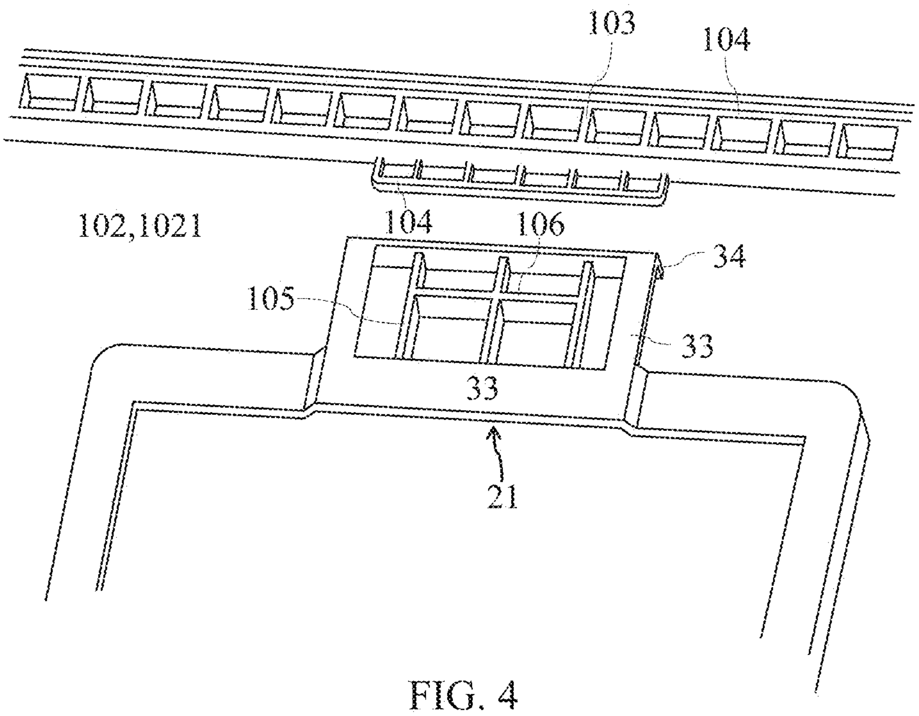
FIG. 4 is a schematic diagram illustrating the structure for the inner surface of the second housing according to the present invention.
Figure 5:
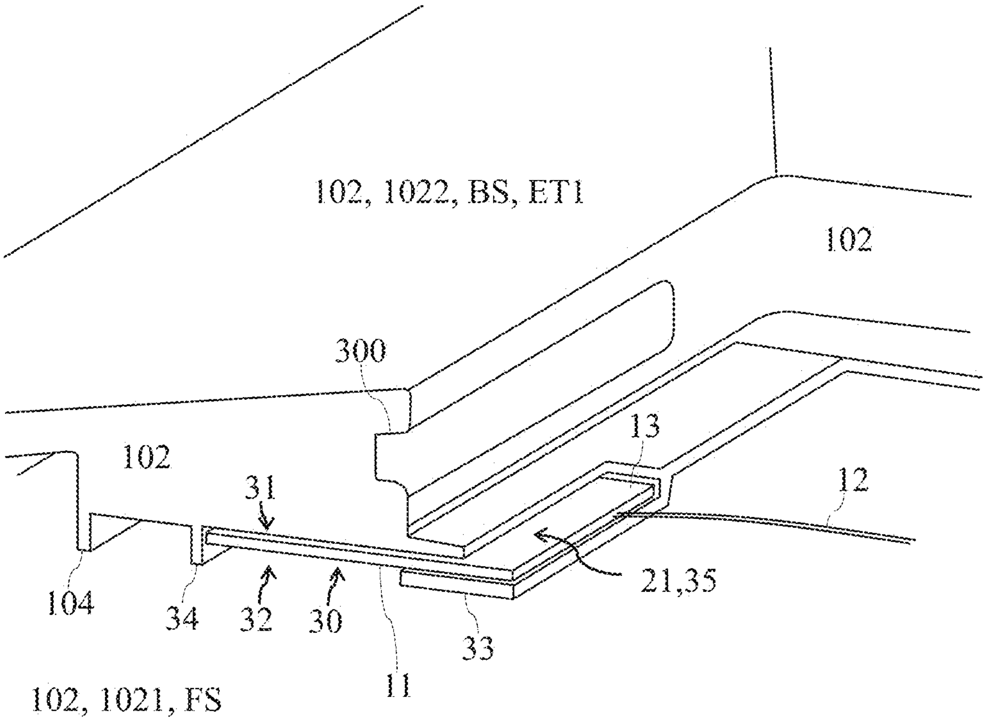
FIG. 5 is a lateral cross-sectional schematic diagram illustrating the structure for the antenna slot according to the present invention.

FIG. 3 is a schematic diagram illustrating the structure for the outer surface of the second housing according to the present invention; FIG. 4 is a schematic diagram illustrating the structure for the inner surface of the second housing according to the present invention; and FIG. 5 is a lateral cross-sectional schematic diagram illustrating the structure for the antenna slot according to the present invention. FIG. 3 depicts the structure for the outer surface 1022 of the second housing 102, wherein the outer surface 1022 refers to the side of the second housing 102 facing the external environment. FIG. 4 depicts the structure for the inner surface 1021 of the second housing 102, wherein the inner surface 1021 refers to the side of the second housing 102 enclosed within the housing and facing the internal electronic components.

In order to avoid the electromagnetic shielding effect, it is preferred that the external antenna 11 is configured in a position within the information system 400 where electromagnetic waves can penetrate. In this embodiment, the external antenna 11 is preferably positioned in the first electromagnetic transmission zone ET1 in the first module 100, which is preferably attached to the second housing 102 located on the back side BS of the first module 100.

In some embodiments, it is preferable to manufacture the structure of the antenna slot 20 integrated into the second housing 102 by methods such as, but not limited to, injection molding, during the process of manufacturing the second housing 102, so as to integrate the antenna slot 20 into the second housing 102. As shown in FIG. 4, on the inner surface 1021 of the plastic molded second housing 102 typically has a lot of criss-crossing structural reinforcement ribs, such as multiple longitudinal reinforcement ribs 103 and multiple transverse reinforcement ribs 104, on the edges of the inner surface 1021, so as to strengthen the structural strength of the plastic molded second housing 102 at specific locations. In some embodiments, the antenna slot 20 is preferably designed to be defined and formed by the intersecting structural reinforcement ribs.

In some embodiments, the antenna slot 20 structurally includes an opening 21 and a slot body 30, as shown in FIG. 4. The slot body 30 is preferably a blind hole having a certain depth, and its geometric structure preferably corresponds to the geometric structure of the external antenna 11. Thus, the slot body 30 is also preferably designed to be and made rectangular and flat. However, the geometric shape of the slot body 30 is not limited to rectangular and flat, but may also be circular, triangular, polygonal, or other shapes. The overall structure of the slot body 30 is preferably configured as close as possible to the second housing 102 and compactly arranged with, or preferably parallel to, the inner surface 1021 of the second housing 102, to minimize the space occupation of the external antenna 11 and maintain the tablet-like appearance for the first module 100.

In some embodiments, the slot body 30 includes a first side 31 and a second side 32, wherein the first side 31 is preferably a surface closer to the outer surface 1022, and the second side 32 is preferably a surface closer to the inner surface 1021. The first side 31 is preferably defined by multiple longitudinal reinforcement ribs 105 and multiple transverse reinforcement ribs 106, while the second side 32 is preferably defined by a base plate structure 33, but may also be defined by multiple longitudinal reinforcement ribs 105 and multiple transverse reinforcement ribs 106.

The slot body 30 has a depth D that is defined by a stopper structure 34, which is itself preferably a transverse reinforcement rib or a special barrier structure. The opening 21 is also designed to include a recess structure 35, where the opening 21 has a shape and size that are preferably corresponding to the cross-sectional shape and size of the external antenna 11. In some embodiments, the slot body 30 has a width W and a height H that are preferably defined by the multiple longitudinal reinforcement ribs 105 and multiple transverse reinforcement ribs 106 contained within the second housing 102.

In some embodiments, the structures within the slot body 30, including the first side 31, the second side 32, the base plate structure 33, and the stopper structure 34, may also function inversely as the multiple longitudinal reinforcement ribs 105 and the multiple transverse reinforcement ribs 106 of the second housing 102.

The external antenna 11 is inserted and enters the slot body 30 through the opening 21 until it encounters the stopper structure 34. When the external antenna 11 is successfully inserted into the antenna slot 20, a part of the antenna structure 13 is exposed and protrudes from the recess structure 35. When a user wishes to remove the external antenna 11 out of from the antenna slot 20, the user need only press lightly on this exposed part of the antenna structure 13 and then gently pull the external antenna 11 outward to remove it from the antenna slot 20.

Once the external antenna 11 is successfully inserted into the antenna slot 20, the wireless radio frequency signals 410 transmitted and received by the external antenna 11 can freely enter and leave the first electromagnetic transmission zone ET1 without being obstructed, blocked or shielded by the first electromagnetic shielding zone ES1 and the second electromagnetic shielding zone ES2.

Figure 6:
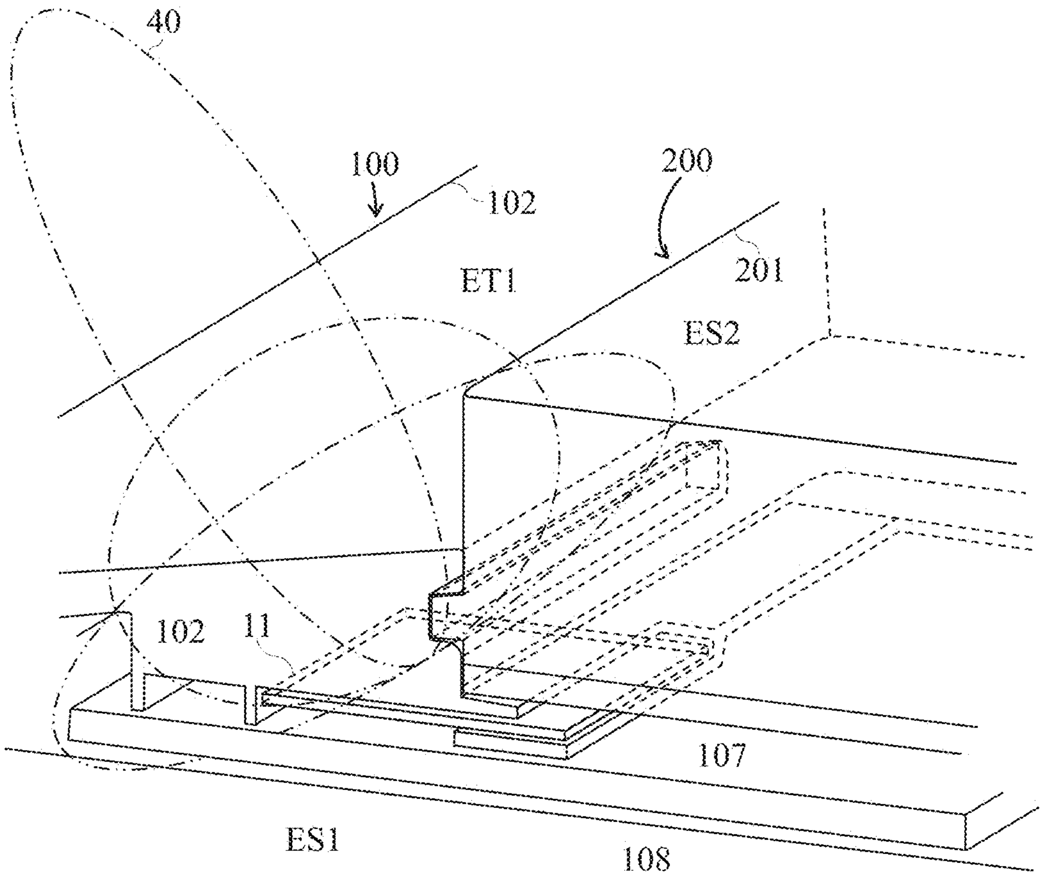
FIG. 6 is a schematic diagram illustrating the actual arrangement and configuration for the external antenna deployed on the first and second modules according to the present invention.

FIG. 6 is a schematic diagram illustrating the actual arrangement and configuration for the external antenna deployed on the first and second modules according to the present invention. In practical application, the external antenna 11 is actually positioned in the first electromagnetic transmission zone ET1 of the second housing 102 included in the first module 100. The configuration position of the external antenna 11 on the first module 100 exactly avoids the first electromagnetic shielding zone ES1 on the front side FS of the first module 100, as well as the second electromagnetic shielding zone ES2 formed by the first cover body 201 of the second module 200. Underneath the second housing 102, there may be metal supports 107, display components 108 and other metal plates, conductive structures or conductors, all of which may cause a certain electromagnetic shielding effect on wireless radio frequency signals.

The external antenna 11 provided by the present invention should avoid conductive materials such as metals and conductor structures as much as possible and should preferably be used in electromagnetic transmission zones made of dielectric materials such as plastics. It should be integrated as much as possible into the housing structure of electronic devices. After bypassing the first electromagnetic shielding zone ES1 and the second electromagnetic shielding zone ES2, the wireless radio frequency signals emitted by the external antenna 11 will form a slightly directional radiation pattern 40, thereby increasing the gain in certain directions.

The external antenna kit provided by the present invention is designed as a quick-draw drawer structure, wherein the included external antenna is easily, conveniently and quickly installed in the antenna slot, allowing for easy, convenient and quick installation. The external antenna kit provided in this invention can be applied to various electronic devices, and since its antenna slot is already integrated with the reinforcement ribs formed on the housing, it can effectively reduce the product cost and the product development cost.

There are further embodiments provided as follows.

Embodiment 1: An external antenna kit includes: a first module including a first electromagnetic shielding zone and a first electromagnetic transmission zone; a second module including a second electromagnetic shielding zone and attached to and communicatively connected with the first module; an external antenna configured separately from and electrically connected to the second module; and an antenna slot configured within the first electromagnetic transmission zone on the first module and having a structural geometry corresponding to that of the external antenna to provide for insertion of the external antenna.

Embodiment 2: The external antenna kit as described in embodiment 1 further includes one of the following: the antenna slot further including a slot body having the structural geometry corresponding to that of the external antenna to provide for insertion of the external antenna; the first module further including a first housing and a second housing; and the slot body is attached to and formed on the first housing or the second housing.

Embodiment 3: The external antenna kit as described in embodiment 2, the slot body has a width and a height that are defined by a plurality of longitudinal reinforcement ribs and a plurality of transverse reinforcement ribs on the second housing.

Embodiment 4: The external antenna kit as described in embodiment 2, the slot body has a depth that is defined by a plurality of longitudinal reinforcement ribs or a plurality of transverse reinforcement ribs on the second housing.

Embodiment 5: The external antenna kit as described in embodiment 2, the slot body has the structural geometry that is flat or flattened, and the slot body is arranged with the first housing or the second housing in a compact formation.

Embodiment 6: The external antenna kit as described in embodiment 1 further includes one of the following: the second module further including a first cover forming the second electromagnetic shielding zone; and the antenna slot further including an opening including a recessed structure.

Embodiment 7: The external antenna kit as described in embodiment 6, when the external antenna is inserted into the antenna slot, a part of the antenna structure is exposed from the recessed structure.

Embodiment 8: The external antenna kit as described in embodiment 1 further includes one of the following: a engaging-fastening linkage module including a engaging mechanism and a fastening mechanism for physically linking up the first module and the second module; the first module including a single transmission line and a single internal transmission connector; and the second module including a single internal communication connector electrically connected to the single internal transmission connector, so to unify an internal communication interface between the first module and second module and form an unified communication connection.

Embodiment 9: The external antenna kit as described in embodiment 1, the external antenna is a Wi-Fi antenna, a Bluetooth antenna, an LTE antenna, or a Sub-G antenna.

Embodiment 10: The external antenna kit as described in embodiment 1, the second module further includes a communication module, which is electrically connected to the external antenna through a signal line.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An external antenna kit, comprising:

a first module comprising a first electromagnetic shielding zone and a second housing made of a dielectric material defining a first electromagnetic transmission zone;

a second module comprising a second electromagnetic shielding zone, an external antenna electrically connected to, but physically separate from, the second module, and a first cover made of a metallic material providing an electromagnetic shielding effect, and attached to and communicatively connected with the first module; and an antenna slot configured within the first electromagnetic transmission zone on the first module, formed with the second housing by molding, and having a structural geometry corresponding to that of the external antenna to provide for insertion of the external antenna, to configure the external antenna at the first electromagnetic transmission zone in the first module away from the first cover in the second module to avoid the electromagnetic shielding effect thereof.

2. The external antenna kit as claimed in claim 1, further comprising one of the following:

the antenna slot further comprising a slot body having the structural geometry corresponding to that of the external antenna to provide for insertion of the external antenna;

the first module further comprising a first housing and thea second housing; and the slot body is attached to and formed on the first housing or the second housing.

3. The external antenna kit as claimed in claim 2, wherein the slot body has a width and a height that are defined by a plurality of longitudinal reinforcement ribs and a plurality of transverse reinforcement ribs on the second housing.

4. The external antenna kit as claimed in claim 2, wherein the slot body has a depth that is defined by a plurality of longitudinal reinforcement ribs or a plurality of transverse reinforcement ribs on the second housing.

5. The external antenna kit as claimed in claim 2, wherein the slot body has the structural geometry that is flat or flattened, and the slot body is arranged with the first housing or the second housing in a compact formation.

6. The external antenna kit as claimed in claim 1, further comprising one of the following:

the second module further comprising a first cover forming the second electromagnetic shielding zone; and the antenna slot further comprising an opening comprising a recessed structure.

7. The external antenna kit as claimed in claim 6, wherein when the external antenna is inserted into the antenna slot, a part of the antenna structure is exposed from the recessed structure.

8. The external antenna kit as claimed in claim 1, further comprising one of the following:

an engaging-fastening linkage module comprising an engaging mechanism and a fastening mechanism for physically linking up the first module and the second module;

the first module comprising a single transmission line and a single internal transmission connector; and the second module comprising a single internal communication connector electrically connected to the single internal transmission connector, so to unify an internal communication interface between the first module and second module and form a unified communication connection.

9. The external antenna kit as claimed in claim 1, wherein the external antenna is a Wi-Fi antenna, a Bluetooth antenna, an LTE antenna, or a Sub-G antenna.

10. The external antenna kit as claimed in claim 1, wherein the second module further comprises a communication module, which is electrically connected to the external antenna through a signal line.

* * * * *